United States Patent

Ames

[11] Patent Number: 4,716,507
[45] Date of Patent: Dec. 29, 1987

[54] OPTICAL COLLIMATOR TARGET ILLUMINATION

[75] Inventor: Alan J. Ames, Casselberry, Fla.

[73] Assignee: The United States of America as represented by the Secretary of the Army, Washington, D.C.

[21] Appl. No.: 862,903

[22] Filed: May 12, 1986

[51] Int. Cl.⁴ .............................................. F21V 8/00
[52] U.S. Cl. ..................................... 362/311; 362/32; 362/326; 350/96.27
[58] Field of Search .................... 350/96.25, 96.27; 355/1; 362/32, 311, 335, 326

[56] References Cited

U.S. PATENT DOCUMENTS

| | | | |
|---|---|---|---|
| 3,033,071 | 5/1962 | Hicks, Jr. | 350/96.25 |
| 3,735,032 | 5/1973 | Goetze et al. | 350/96.27 X |
| 4,462,662 | 7/1984 | Lama | 350/413 |

FOREIGN PATENT DOCUMENTS 492838  1/1976  U.S.S.R. .......................... 350/96.27

OTHER PUBLICATIONS

*Radiation, Light, and Illumination* by C. P. Steinmetz, McGraw-Hill, NYC & London c. 1909, pp. 260–261.

Primary Examiner—Samuel Scott
Assistant Examiner—Allen J. Flanigan
Attorney, Agent, or Firm—Norman L. Wilson, Jr.

[57] ABSTRACT

Collimators are widely used optical instruments for testing, calibrating and measuring. In one type of collimator slits or patterns, called targets, are said to be projected to infinity. Placing a target in the focal plane of a collimator is a known technique for making a uniform target appear to be in the far field. This led to the use of collimators in training devices and in target simulations. When a surface is illuminated by a small light source, as is the target in a collimator, the illumination of points on the target surface off the light axis will be lower than illumination of the area of the surface on the axis. Since the peripheral surface illumination is a function of the cosine fourth power, there is considerable reduction in illumination at the periphery of a target. Mitigation of peripheral target of illumination in collimators is overcome herein by disposing a fiber optic faceplate between the light source and the target.

2 Claims, 5 Drawing Figures

OPTICAL COLLIMATOR TARGET ILLUMINATION

BACKGROUND OF THE INVENTION

This invention pertains to optical collimators, and particularly to the improvement of their target illumination means.

Collimators are widely used optical instruments. They are especially valuable because they make divergent or convergent rays of light parallel. Consequently in the field of optics collimators are adapted for testing, calibrating and measuring instruments as described in U.S. Pat. Nos. 4,422,758, 4,022,533, 3,966,328, and 3,915,575, 3,518,005, and *TEE Transactions on Instrument and Measurement,* Vol IM-34, No. 1, March, 1985 at page 51.

In other types of collimators slits or patterns are said to be projected to infinity. Such patterns are called targets. Placing a target in the focal plane of a collimator is a known technique for making a uniform target appear to be in the far field. This far field response has led to the use of collimators in training devices and in target simulations. The technique is to use standard targets which are commonly available as target sets. Such sets include four-bar and area targets. Four-bar targets are plates having equally spaced bars or slits each generally about 0.32 cm. wide with a 7:1 aspect ratio. Area targets are square aperture plates, and the targets must be provided with slits or cut-out portions in order to be visible since their lighting emanates behind them.

When a surface is illuminated by a small light source, as is the target in a collimator, the illumination of points on the target surface off of the light axis will be lower than illumination of the area of the surface on the axis. Illumination $E_o$ of the point on the light axis is $E_o = I_o/R_o^2$ where $I_o$ is the normal source intensity and $R_o$ is the distance away from it.

Considering a point on the periphery of the target surface if the surface at that point was normal to light ray the illumination $E(\theta)$, where $\theta$ is the angle between the axis and the ray to the peripheral point, would be $E(O) = I_o \cos^3\theta/R^2$. However, since surface at the peripheral point is not pependicular to the light ray, the intensity $(E(\theta))$ is $E(\theta) = I_o \cos^4\theta/R^2$. This is known as the cosine-fourth power law.

The cosine of the angle is a fraction. Since the peripheral surface illumination is a function of the fourth power of this fraction, there is considerable reduction in illumination at the periphery of a surface. Even though the target is small, this reduction in illumination is important in a collimator. In accordance with this invention, the problem of mitigation of peripheral target of illumination in collimators is overcome.

SUMMARY OF THE INVENTION

In a collimator having a target illuminated by light source positioned adjacent thereto on an axis through the centerpoint of the target, the off-axis or peripheral illumination of the target is lower than the illumination at the target axis by an amount proportional to the cosine fourth power law. Means for obtaining uniform illumination across the target without a loss of illumination at its periphery are provided herein. A fiber optic faceplate is positioned between the light source and the target. The faceplate is a coherent fiber optic bundle having an aggregate bundle cross section equal to the cross section of the target. The bundle is disposed with its longitudinal axis lying on the target axis. Preferably the fiber optic bundle will have a concave end adjacent the light source enabling it more readily to to overcome the cosine fourth power illumination lowering effect.

DETAILED DESCRIPTION OF THE INVENTION

Some military uses of collimators require the use of a long focal length collimator say 100 inches or more. Such long focal length instruments require a proportionately large optical source for a uniform intensity over a large field of view. This is particularly true of peripheral target areas exhibiting light loses attributable to the cosine fourth power law of illumination. Prior art devices hae had to include compromises in order to minimize the effect of the cosine fourth power law. Herein, rather than such sacrifices a fiber optic faceplate is employed. For a more complete understanding of its use, the invention will be described with reference to the accompanying drawings.

FIG. 1 is a diagrammatic view of a conventional off-axis collimator.

FIG. 2, also diagrammatic, is another form of an off-axis collimator.

Figure 1:
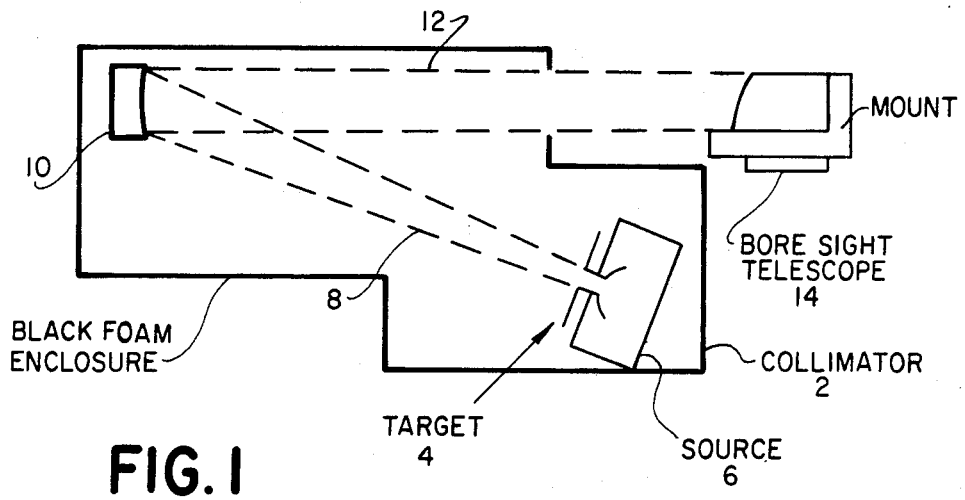

Referring first to FIG. 1, a conventional target system is illustrated. A collimator 2 is shown, which includes a target 4 so that the collimator can be used for target training or optical instrument calibration. Target 4 is illuminated by light source 6 so that optical beam 8 emanating therefrom is refelected by a collimator mirror 10 as an optical beam 12 in order that a target image (not shown) can be perceived by a bore sight, telescope, or viewer 14. For gunnery training purposes a circular, rather than a bar, target is used. In this case, light over an extended surface of the target is essential. Such targets are, of course, well know. Since they are also commercially available they need not be discussed at length herein.

Figure 2:
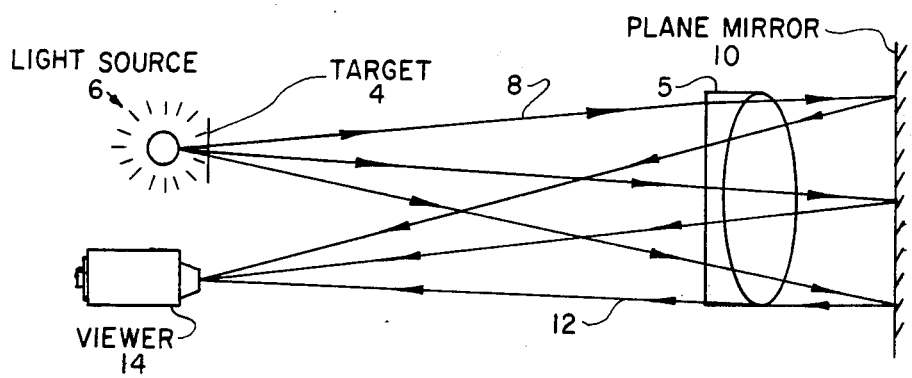

FIG. 2 is another form of collimator with an illuminated target 4 disposed near the focus of objective lens 5. The lens is placed in front of a plane mirror 10 which reflects the light back into the lens. It can then be focused on a viewer 14 in the same plane as the target.

The total luminous flux, dF, received by an incremental surface $dS_2$ a distance Z from a light surface $dS_1$, has a luminance L in all directions as given by the cosine fourth power law in the form:

$$dF = \frac{LdS_1 dS_2 \cos 4\theta}{Z^2} \quad (1)$$

As noted, the surface of a target off of the light axis is not as well illuminated as the target area on the axis. This can be demonstrated by the following calculations showing that the luminous flux, dF, received by the target surface at an angle $\theta$ of 0° and a distance Z of 1.0 cm is 1.0 lumen. However if the angle is 30° then dF is 0.56 lumen.

Assuming
$L = 100.$ lumen/cm$^2$—steradian
$dS_1 = dS_2 = 0.1$ cm$^2$
$Z = 1$ cm It is understood that $dS_1$ represents the incremental source area, and the ratio $dS_2/Z^2$ represents the incremental solid angle of the target as observed from source (sr).

At 0°:

$$dF = \left(\frac{100 \text{ lumens}}{\text{cm}^2 \text{ sr}}\right)(0.1 \text{ cm}^2)\left(\frac{0.1 \text{ cm}^2}{1.0 \text{ cm}^2}\right)(\cos^4 0°) = 1.0 \text{ lumen}$$

At 30°:

$$dF = \left(\frac{100 \text{ lumens}}{\text{cm}^2 \text{ sr}}\right)(0.1 \text{ cm}^2)\left(\frac{0.1 \text{ cm}^2}{1.0 \text{ cm}^2}\right)(\cos^4 30°) = 0.56 \text{ lumen}$$

It is to be understood that while the above relationship allows the examination of the luminous flux at the target, surface, it does not represent a convenient mathematical relationship because it is expressed in terms of the geometrical angular relationship existing between the source and the target. It is more useful to examine the luminous flux at the target surface in terms of the geometrical coordinates of the target itself. And it is possible to establish a mathematical relationship on this basis.

Figure 4:
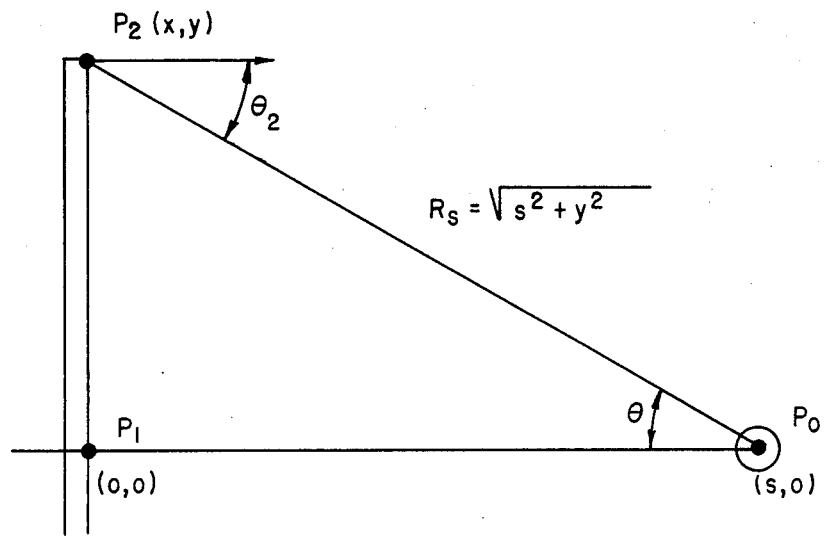
FIGS. 4 and 5 show the angles used in mathematical derivations utilized herein.

If a coordinate system is established at the target surface centered at (O, O), FIG. 4, then the luminous flux will exhibit a parabolic distribution with a maximum value at the origin. This is a natural outcome of the cosine fourth power law. My invention encompasses a direct method for achieving this distribution and producing a more uniform spreading of luminous flux.

Referring to FIG. 4, the light source is located at point P and the target surface extends outwardly from its center at $P_1$ to its edge at $P_2$. With this configuration, the distance from $P_0$ to $P_1$ is equal to S. This distance is equivalent to the Z term equation (1). If the target is not curved, $\theta_1 = \theta_2$, the $\theta$ of equation (1). The luminance L can now be expressed in lumens per meter square per steradians as follows:

$$dF = \frac{LdS_1 dS_2 \cos^4 \theta}{S^2} \quad (2)$$

The cosine O is equal to $$\frac{S}{\sqrt{S^2 + Y^2}}.$$

Therefore, the radial luminous flux at the target may be expressed as a function of the radial distance from the center of the target, the equation becoming, $$dF = \left(\frac{LdS_1 dS_2 S^2}{(S^2 + Y^2)^2}\right) \quad (3)$$

A binomial expansion of the denominator will yield the following:

$$dF = \frac{LdS_1 dS_2}{S^2}\{1 - 2(Y^2/S^2)\} \quad (4)$$

Equation (4) enables us to calculate luminous flux at the target in terms of linear dimensions of the target, Y, the lamp to target displacement, S, and the lamp luminance, L. In order to maintain a uniform target luminous flux, the ratio of Y to S must be very small. Since the target dimension, Y, is fixed by the collimator design, the dimension S is typically large. This means the value of L must also be quite large. The inclusion of ground glass at the target plane insures a uniform dispersion of the source luminous intensity towards the collimator, but it does not modify these basic mathematical relationships.

Figure 3:
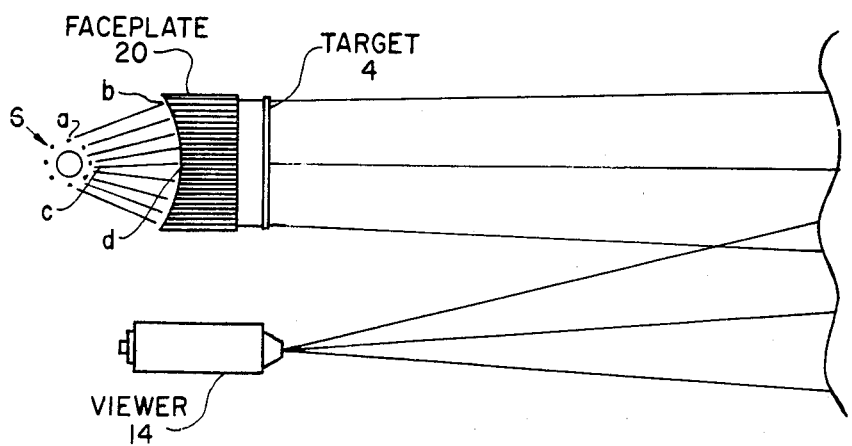
FIG. 3 shows the portion of the collimator of FIG. 2 which embodies this invention.

The procedures discussed in the derivation of equations (1) and (4) represent the common methodology for designing a target in terms of luminous flux. However, when applied herein the result is a low efficiency device. At the edge of the target the fractional flux of the lamp passed through the target is approximately equal to the fourth power loss divided by 4. Thus, if the target uniformity were to be, say, 10 percent by the cosine fourth power law, only 0.8 percent of the flux from the lamp would pass directly through the periphery of the target or the faceplate. Hence ideally the distance from the light source to the faceplate edges should be equal. This can be accomplished if the faceplate is curved as in FIG. 3. Thus, in FIG. 3, the distance from a to b is equal to the distance from c to d. If the surface of faceplate 20 adjacent the light source 6 is concave, illumination at b is equal to that at d, and the cosine fourth power law does not affect target illumination. Desirably, then, the optical fibers are configured to form a parabolic faceplate 20, as can be seen in FIG. 3. This face transmits light waves to the target so that mitigation of illumination at is periphy is minimized.

Figure 5:
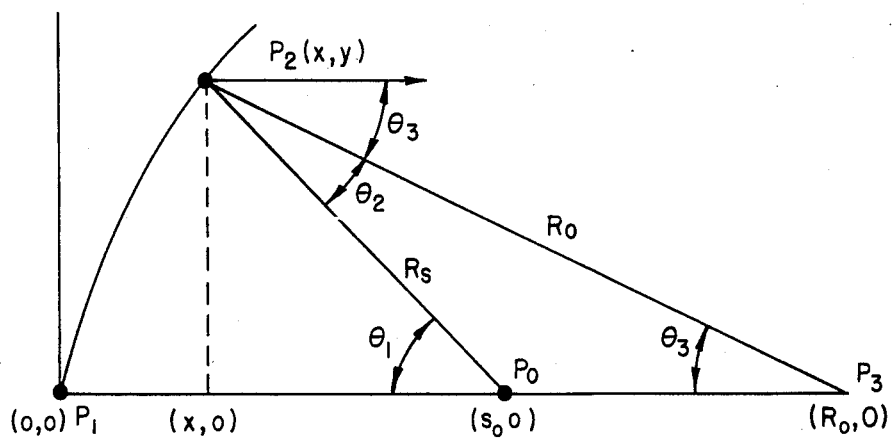

For the design of this curvature we refer to FIG. 5, where the curve $P_1$–$P_2$ represents the curved fiber optic face plate with radius $R_o$. The light source is located at $P_o$ a distance S from the faceplate. In applying the equation to this configuration, it should be noted that the cosine term associated with $dS_2$ is $\theta_2$ and that the area $dS$ is increased by the secant of $\theta_3$ since the fibers are now cut at an angle $\theta_3$. The axial separation between any point $P_2$ and $P_o$ is $(S-X)$. Therefore, equation (1) can be rewritten as:

$$dF(@ P_2) = \frac{LdS_1 dS_2 \cos\theta_2 \cos^3\theta_1}{(S-X)^2 \cos\theta_3}$$

At the point $P_1$, this equation reduces to $$dF(@ P_1) = \frac{LdS_1 dS_2}{S^2}$$

These expressions can then be equated, bringing about a condition of uniform illumination, thus:

$$\frac{\cos\theta_2 \cos^3\theta_1}{(S-X)^2 \cos\theta_3} = \frac{1}{S^2} \quad (6)$$

The design of the faceplate yields a solution to this expression as a function of X and Y with a fixed value of S. Although it will be parabolic, considerations encourage a spherical solution, the faceplate having a radius $R_o$. If we assume a nominal value of $R_o$ equal to 1 cm and $\theta_3$ equal to 30° as in the prior example, and if we assume the separation between the source and center of curvature is very small, where $\theta_2$ approaches 0° and $\theta_1$ approaches 30°, the above expression reduces to an identity. This confirms our view that a spherical surface on the faceplate will produce a uniform illumination if displaced very slightly from the center.

Returning to equation 6 for the illumination at point $P_2$, if $O_2=0$, and $O_1=O_3$ then the expression reduces to:

$$dF(@\ P_2) = \frac{LDS_1 dS_2 \cos^2\theta_1}{(1 - [1 - \cos\theta])^2} = LdS_1 dS_2 \quad (7)$$

Using this equation the illumination of the target will be constant at all angles.

It is now apparent that this invention provides a collimator with a uniformly illuminated target, not heretofore achieved. Given the teachings of the invention modifications will occur to those skilled in the art. For example this invention utilizes fused optical fibers chosen so that their diameters are beyond the resolution limit of the collimator. Typically, these diameters are on the order of ten microns. However, fibers and integral optical fiber bundles are commercially available and hence not a part of this invention. Therefore, various optical fiber bundles can be used. Preferred fibers or light guides are coherent image bundles, although non-coherent fiber optic bundles can be used herein, since image clarity is not a factor. The optical fiber selection, as well as the type of collimator employed and its end use, are a matter of choice. Such ramifications and variations are deemed to be within the scope of this invention.

What is claimed is:

1. In a collimator including a target illuminated by a light source positioned adjacent thereto with its axis through the centerpoint of the target, the off-axis illumination of the target being lower than illumination at the light axis by an amount proportional to the fourth power of cosine of the angle at which light strikes the periphery, means for obtaining uniform illumination across the target with increased illumination at its periphery comprising a fiber optic faceplate positioned between the light source and the target, the faceplate being a coherent fiber optic bundle, the bundle being disposed with its longitudinal axis lying on the target axis, the bundle having a concave end so that a curved surface is adjacent the light source, the curvature of the curved surface being such that the distance from the light source to off-axis fibers in the bundle is equal to the distance from the light source to a fiber on the light axis, overcoming the cosine fourth power illumination lowering effect.

2. The collimator of claim 1 wherein the fiber optic bundle has a crosssection equal to that of the target.

* * * * *